(12) United States Patent
Calvo Martinez et al.

(10) Patent No.: US 11,787,380 B2
(45) Date of Patent: Oct. 17, 2023

(54) ELECTROMECHANICAL BRAKE BOOSTER COMPRISING A DAMPING ELEMENT, VEHICLE BRAKE SYSTEM, ASSEMBLY THEREFOR AND DAMPING ELEMENT

(71) Applicant: ZF ACTIVE SAFETY GMBH, Koblenz (DE)

(72) Inventors: José Manuel Calvo Martinez, Kruft (DE); Martin Struschka, Braubach (DE); Abdallah Ibrahim, Urmitz (DE); Fabian Kern, Harschbach (DE)

(73) Assignee: ZF ACTIVE SAFETY GMBH, Koblenz (DE)

( * ) Notice: Subject to any disclaimer, the term of this patent is extended or adjusted under 35 U.S.C. 154(b) by 11 days.

(21) Appl. No.: 16/770,103

(22) PCT Filed: Oct. 29, 2018

(86) PCT No.: PCT/EP2018/079530
§ 371 (c)(1),
(2) Date: Jun. 5, 2020

(87) PCT Pub. No.: WO2019/110200
PCT Pub. Date: Jun. 13, 2019

(65) Prior Publication Data
US 2020/0384972 A1    Dec. 10, 2020

(30) Foreign Application Priority Data
Dec. 7, 2017    (DE) .......................... 102017222138.0

(51) Int. Cl.
*B60T 13/74*        (2006.01)
*F15B 15/22*        (2006.01)
*F16D 121/24*       (2012.01)

(52) U.S. Cl.
CPC .......... *B60T 13/746* (2013.01); *B60T 13/743* (2013.01); *B60T 13/745* (2013.01); *F15B 15/226* (2013.01); *F16D 2121/24* (2013.01)

(58) Field of Classification Search
CPC ...... B60T 7/042; B60T 8/4077; B60T 8/4081; B60T 13/745; B60T 13/145;
(Continued)

(56) References Cited

U.S. PATENT DOCUMENTS 4,662,687 A * 5/1987 Leiber .................... B60T 7/042
                                                  303/113.3
5,988,768 A * 11/1999 Schaefer ............... B60T 8/3655
                                                  303/114.1
(Continued)

FOREIGN PATENT DOCUMENTS

DE   102004050103      4/2006
DE   102011080914      2/2013
DE   102015209600 A1   12/2016

*Primary Examiner* — Nicholas J Lane
*Assistant Examiner* — Stephen M Bowes
(74) *Attorney, Agent, or Firm* — TAROLLI, SUNDHEIM, COVELL & TUMMINO L.L.P.

(57) ABSTRACT

The invention relates to an electromechanical brake booster for a vehicle brake system, comprising an actuating unit that can be coupled to a brake cylinder. The actuating unit comprises at least one actuating element that can be coupled to an electric motor by means of a transmission. The actuating unit also comprises an actuating member that can be coupled to a force input member. The brake booster comprises at least one housing in which at least sections of the actuating unit are received. At least one damping element is arranged between the at least one housing and at least the at least one actuating element.

16 Claims, 5 Drawing Sheets

(58) Field of Classification Search
CPC ........ B60T 13/146; B60T 13/746; F16F 1/36;
F16F 1/376; F16F 15/08; F16F 15/226;
F16D 2121/24
See application file for complete search history.

(56) References Cited

U.S. PATENT DOCUMENTS

| | | | | |
|---|---|---|---|---|
| 2005/0039596 A1* | 2/2005 | Krebs | ................... | B60T 13/569 91/376 R |
| 2005/0110341 A1* | 5/2005 | Kusano | ................... | B60T 11/16 303/113.4 |
| 2007/0199436 A1 | 8/2007 | Ikeda et al. | | |
| 2008/0086966 A1* | 4/2008 | Stevens | ................... | F16F 1/376 52/347 |
| 2009/0243172 A1* | 10/2009 | Ting | ........................ | F16F 1/376 267/141.1 |
| 2010/0133897 A1* | 6/2010 | Von Hayn | ............. | B60T 8/4077 303/155 |
| 2011/0048874 A1 | 3/2011 | Vollert et al. | | |
| 2011/0248557 A1* | 10/2011 | Overzier | ................. | B60T 11/18 303/3 |
| 2011/0297493 A1* | 12/2011 | Vollert | ................... | B60T 13/575 188/106 R |
| 2014/0046502 A1* | 2/2014 | Schmitt | ................... | B60G 11/00 701/1 |
| 2015/0001921 A1* | 1/2015 | Murayama | .............. | B60T 7/042 303/14 |
| 2016/0016569 A1* | 1/2016 | Odaira | .................. | B60T 13/745 303/15 |
| 2016/0272184 A1* | 9/2016 | Zhang | ................... | B60T 13/745 |
| 2018/0257618 A1 | 9/2018 | Wingender et al. | | |
| 2018/0273011 A1 | 9/2018 | Wingender et al. | | |
| 2019/0001948 A1* | 1/2019 | Kim | ...................... | B60T 13/686 |
| 2020/0276964 A1* | 9/2020 | Goto | ....................... | B60T 13/04 |

* cited by examiner

ELECTROMECHANICAL BRAKE BOOSTER COMPRISING A DAMPING ELEMENT, VEHICLE BRAKE SYSTEM, ASSEMBLY THEREFOR AND DAMPING ELEMENT

RELATED APPLICATION

This application corresponds to PCT/EP2018/079530, filed Oct. 29, 2018, which claims the benefit of German Application No. 10 2017 222 138.0, filed Dec. 7, 2017, the subject matter of which are incorporated herein by reference in their entireties.

TECHNICAL FIELD

The present disclosure relates in general to the technical field of electrohydraulic braking force generating devices. In particular, it relates to an electromechanical brake booster, which can be used in an electrohydraulic braking force generating device.

PRIOR ART

Electromechanical brake boosters are driven by electric motors. In order to be able to produce an intensification of the braking force with the brake booster, the rotary motion of the output shaft of the electric motor must be converted into a translational motion. Various devices are known for this purpose from the prior art.

An electromechanical brake booster is disclosed in DE 10 2015 012 124 A1. The electromechanical brake booster has a motor, a control unit, a gear mechanism and an actuating device. The actuating device is coupled to a brake cylinder. The actuating device has a first actuating element and a second actuating element. The first actuating element can be subjected to a braking force exerted on a brake pedal by a driver of the vehicle. Rack sections, which are in engagement with gearwheels of the gear mechanism, are provided on the second actuating element. The second actuating element is moved in the direction of the brake cylinder by the electric motor by means of the intermeshing gearwheels and rack sections in order to introduce the boosting force demanded by the driver into the brake cylinder.

In DE 10 2015 012 125 A1, an electromechanical brake booster is disclosed, which has a similar construction to the brake booster disclosed in DE 10 2015 012 124 A1.

During a braking operation, there can be unwanted vibration and noise generation in various operating states in the case of the abovementioned electromechanical brake boosters.

BRIEF SUMMARY

The object is to specify an electromechanical brake booster in which unwanted vibrations and noise generation can be suppressed.

The electromechanical brake booster for a vehicle brake system comprises an actuating unit, which can be coupled to a brake cylinder. The actuating unit has at least one actuating element, which can be coupled to an electric motor by means of a gear mechanism. Furthermore, the actuating unit has an actuating member, which can be coupled to a force input member. The brake booster comprises at least one housing, in which at least a section of the actuating unit is accommodated. At least one damping element is arranged between the at least one housing and at least the at least one actuating element.

The at least one damping element does not necessarily have to be arranged only between the housing and the at least one actuating element. In addition to the actuating element, the at least one damping element can also extend between the housing and one or more further components of the actuating unit, e.g. the actuating member. Moreover, it is possible for no further components, one further component or a plurality of further components to be situated between the at least one housing and at least the at least one actuating element, in addition to the damping element.

The at least one damping element can be arranged between the at least one housing and the at least one actuating element in the direction of a longitudinal axis of the brake booster. The at least one damping element can be arranged between a surface of the at least one actuating element, said surface extending substantially perpendicularly to the longitudinal axis of the brake booster, and the at least one housing. One section of the at least one housing can likewise extend perpendicularly to the longitudinal axis of the brake booster. That surface of the at least one actuating element which extends perpendicularly to the longitudinal axis of the brake booster can be an end face of the at least one actuating element. The at least one damping element can be arranged between the end face of the at least one actuating element and a section of the at least one housing which extends substantially perpendicularly to the longitudinal axis of the brake booster.

The at least one damping element can have a plurality of buffer elements. The buffer elements can be in the form of (e.g. knob-type) projections or elevations. The buffer elements can be arranged spaced apart on the damping element. The buffer elements can be arranged in a circle and/or concentrically. The buffer elements can project in the direction of the at least one actuating element. The buffer elements can damp an impact of the at least one actuating element on the housing.

The at least one damping element can have a damping section and a fastening section. The fastening section can hold the at least one damping element on the at least one housing.

The at least one housing can have a section which interacts with the fastening section of the at least one damping element to fasten and position the at least one damping element on the housing. This section of the housing can accommodate a section of the fastening section. This section of the housing can be of stepped design and can be coupled to the fastening section of the at least one damping element. The housing section of stepped design can be formed by a section of smaller diameter and a section of larger diameter, which are connected to one another by a shoulder.

The fastening section can be designed to be latched to the at least one housing. For this purpose, the fastening section can comprise a multiplicity of latching projections. The latching projections can each have a latching nose. The latching noses on the latching projections can face radially outward. The fastening section can be latched to the housing by means of the latching noses. The latching noses of the fastening projections can engage and latch into the housing section of stepped design. The latching projections can extend in the direction of the center line of an opening in the damping element. The latching projections can be formed separately from one another and spaced apart. The mutually separate and spaced latching projections enable the fastening section to be deformed elastically. The fastening section can be compressed when it is passed through the housing section of smaller diameter. As soon as the latching noses reach the section of larger diameter, they engage behind the shoulder at the transition between the two sections of the housing.

The damping section of the damping element can be of disk-shaped design. If a plurality of buffer elements is provided on the damping section, the buffer elements can be arranged in a manner distributed over the disk-shaped damping section. The individual buffer elements can be formed or arranged on the damping section in a manner offset relative to one another in the circumferential direction of the damping element.

The damping section can be produced from an elastic material. In particular, a rubber-elastic material can be used for the damping section. The damping section and the fastening section can be produced from different materials. The fastening section can be produced from a harder material than the damping section. The fastening section can be produced from a plastic or from metal, for example. The fastening section can be molded onto the damping section by means of an injection molding process, for example.

The brake booster can have at least one positioning element. The at least one positioning element can hold the at least one force input member in an assembly position. The assembly position of the force input member can correspond to a position of the force input member relative to the brake booster in which the longitudinal axis of the force input member assumes a defined position relative to a longitudinal axis of the brake booster. The longitudinal axis of the force input member can extend obliquely or parallel to the longitudinal axis of the brake cylinder. According to one implementation, the longitudinal axis of the force input member can coincide substantially with the longitudinal axis of the brake booster in the assembly position of the force input member.

The at least one positioning element can have a section which is conical or of some other design. By means of this section, the at least one positioning element can come to rest against the at least one damping element. According to one implementation, the at least one positioning element can come to rest by means of its conical section against the fastening section of the at least one damping element.

The fastening section of the at least one damping element can have an opening with a conical section, which interacts with the conical section of the at least one positioning element. The at least one damping element can have an opening, through which the at least one force input member extends. The interacting conical sections of the fastening section and of the positioning element hold the force input member in the assembly position. For example, the positioning element and the damping element can hold the force input member in an assembly position in which the longitudinal axis of the force input member coincides with the longitudinal axis of the brake booster.

The at least one force input member can have a groove, in which the at least one positioning element is arranged. The at least one positioning element can have an opening with a slot to enable it to be mounted on the force input member. The slot enables the positioning element to be expanded elastically to enable it to be mounted on the force input member in the region of the groove. The slot in the positioning element allows elastically reversible expansion of the inside diameter of the opening of the positioning element, thus enabling the positioning element to be pushed over the outside diameter of the force input member in the region of the groove and to receive this section of the force input member. The at least one positioning element can then reassume substantially its original state and is fixed in its position on the force input member. The at least one positioning element can be of disk-shaped design. The conical section can be formed on the outer surface of the positioning element.

The at least one actuating unit can have a force transmission element, which can be coupled in a force-transmitting manner to the at least one actuating element. The at least one force transmission member can accommodate the at least one actuating member. The force transmission element can be movable in the direction of the longitudinal axis of the brake booster. The at least one force transmission member can have a receptacle for a rubber-elastic reaction disk. The rubber-elastic reaction disk can rest against a contact surface of the force transmission element. The actuating member can be embodied in the form of a piston and can be accommodated in the force transmission element in such a way as to be movable relative to the force transmission element. The actuating member can be supported via a spring on the force transmission member.

The actuating member can have a recess. The force input member can have a spherical end section. The recess in the actuating member and the spherical end section of the force input member can form a joint, which enables the force input member to be moved relative to the actuating member. The force input member can project into a passenger compartment of a vehicle. Within the passenger compartment of the vehicle, the force input member can be coupled rigidly to a brake pedal assembly in order to transmit the actuating force produced by a driver of the vehicle to the actuating member.

The at least one force transmission element can have at least one contact shoulder. The at least one actuating element can be brought into contact with the at least one contact shoulder. In other words, the at least one actuating element can rest against the contact shoulder of the force transmission element in order, by means of this contact, to be able to transmit the boosting force provided by the electric motor and the gear mechanism to the force transmission element.

The at least one actuating element can have at least one rack section, which can be coupled to the electric motor by means of a gear mechanism. The gear mechanism can be a spur wheel mechanism which is driven by an electric motor and to which at least one rack section is coupled. By means of the rack section, the rotary motion output by the electric motor can be converted into a translational motion of the at least one actuating element. The at least one actuating element can have two or more rack sections, which can each be in engagement with a gearwheel or a spur wheel of a gear mechanism.

An assembly for a vehicle brake system is furthermore specified. The assembly has a brake booster of the type described above and a brake cylinder, which can be coupled fluidically to at least one brake circuit of the vehicle brake system. The brake booster can be coupled in a force-transmitting manner to the brake cylinder and serves to actuate the brake cylinder.

The brake cylinder can be mounted on the housing of the brake booster. The brake cylinder can have at least one pressure piston, which is accommodated movably in at least one pressure chamber. By means of the pressure piston, at least one brake circuit of the vehicle brake system can be subjected to hydraulic brake pressure. The pressure piston can be subjected to the boosting force of the brake booster and to the actuating force produced by the driver in order to produce the desired brake pressure at the wheel brakes connected to the brake cylinder.

A vehicle brake system having the assembly described above or a brake booster of the type described here is furthermore specified.

A damping element for an electromechanical brake booster is furthermore specified. The electromechanical brake booster comprises an actuating unit, which can be coupled to a brake cylinder, and at least one housing, in which at least a section of the actuating unit is accommodated. The actuating unit has at least one actuating element, which can be coupled to an electric motor by means of a gear mechanism, and at least one actuating member, which can be coupled to a force input member. The at least one damping element is designed to be arranged between the at least one housing and at least the at least one actuating element.

BRIEF DESCRIPTION OF THE FIGURES

Further advantages, details and features of the solution described here will emerge from the following description of illustrative embodiments and from the figures. In the figures.

DETAILED DESCRIPTION

Figure 1:
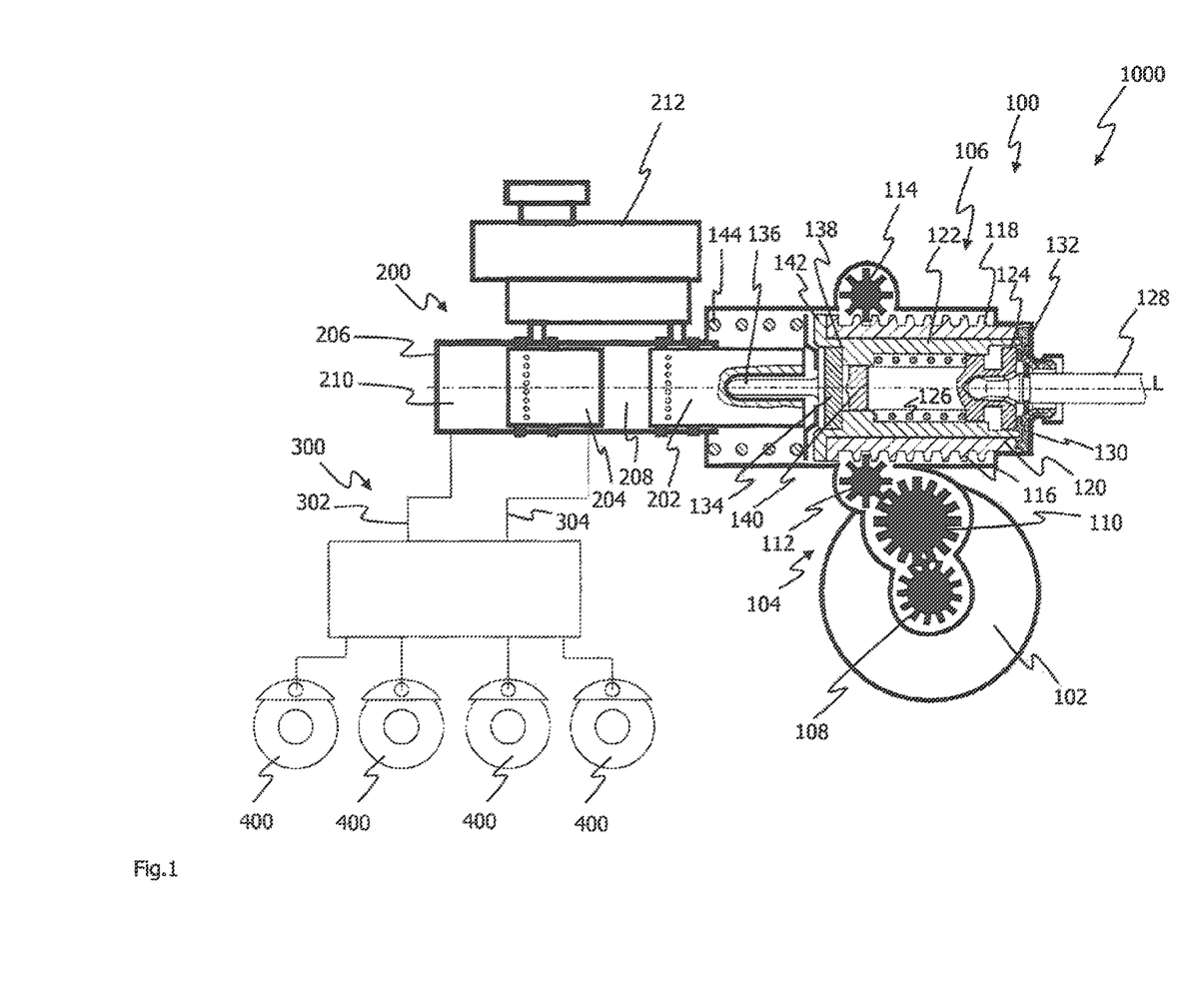
FIG. 1 shows a view of a vehicle brake system having a brake booster according to one illustrative embodiment.

FIG. 1 shows a view of an illustrative embodiment of a vehicle brake system 1000. The vehicle brake system 1000 has a brake booster 100, a brake cylinder 200, brake circuits 300 and wheel brakes 400 connected to the brake circuits 300. The brake cylinder 200 can be a brake master cylinder of the vehicle brake system 1000.

The brake booster 100 comprises an electric motor 102, a gear mechanism 104 and actuating unit 106. The electric motor 102 has an output gearwheel 108, which is coupled to the spur wheels 112 and 114 by an intermediate wheel 110 and further spur wheels or mechanism components, which are not shown. The spur wheels 112 and 114 are coupled to the actuating unit 106 of the brake booster 100. The spur wheels 112 and 114 are in engagement with rack sections 116 and 118 of an actuating element 120 of the actuating unit 106.

The actuating element 120 accommodates a section of a force transmission element 122. An actuating member 124 is accommodated in the force transmission element 122 in such a way as to be movable in the direction of the longitudinal axis L. The actuating member 124 is supported via a spring 126 on the force transmission element 122.

The actuating member 124 is coupled in articulated fashion to a force input member 128. The force input member 128 can project into the passenger compartment when the brake booster 100 is in the mounted state on the vehicle (not shown). In the passenger compartment of the vehicle, the force input member 128 can be coupled rigidly to a brake pedal assembly. The force input member 128 can transmit the actuating force exerted on the brake pedal by the driver to the actuating unit 106 of the brake booster 100. The force input member 128 transmits the actuating force of the driver to the actuating member 124, which is moved to the left in FIG. 1 while compressing the spring 126 in order to be able to transmit the actuating force exerted by the driver to the brake master cylinder 200.

The brake booster 100 has a housing 130, in which at least the actuating unit 106 is accommodated. A damping element 132 is arranged between the actuating element 120 and the housing 130. During a return movement of the actuating unit 106, the damping element 132 damps the impact of the actuating element 118 on the housing 130. By means of the damping action of the damping element 132, unwanted vibration and, in particular, noise generation (such as impact noises) that can arise when the actuating element 120 strikes the housing 130 can be suppressed.

The actuating unit 106 furthermore has a rubber-elastic reaction disk 134, which is connected to a force introduction element 136. The reaction disk 134 is accommodated in the force transmission element 122 and rests against a surface 138 of the force transmission element 122 which extends perpendicularly to the longitudinal axis L. On the actuating member 124, an end element 140, which is designed to act on the reaction disk when the brake booster 100 is actuated. The force introduction element 136 has a peg-shaped section. This peg-shaped section is partially accommodated in a pressure piston 202 of the brake master cylinder 200. Apart from the pressure piston 202, the brake master cylinder 200 has a further pressure piston 204. The pressure pistons 202 and 204 define pressure chambers 208 and 210 filled with hydraulic fluid in the housing 206 of the brake master cylinder 202. The brake master cylinder 200 is supplied with brake fluid by means of a tank 212. The pressure chambers 208 and 210 in the brake master cylinder 200 are each connected to a brake circuit 302 and 304. By means of the brake circuits 302 and 304, two wheel brakes 400 in each case can be supplied with hydraulic brake pressure to carry out a braking operation.

The actuation of the brake booster 100 and hence of the assembly comprising the brake booster 100 and the brake cylinder 200 is performed by the driver of the vehicle. The driver of the vehicle actuates the brake pedal (not shown) in the interior of the vehicle, and the actuating force exerted on the brake pedal by the driver is introduced by the force input member 128 into the brake booster 100. By the actuation of the brake pedal, the force input member 128 and the actuating member 124 coupled to the force input member 128 are moved to the left, compressing the spring 126, wherein the end element 140 of the actuating member 124 penetrates into the rubber-elastic reaction disk 134.

With reference to the actuating force exerted on the brake pedal by the driver, it is possible to determine the boosting force to be produced by the electric motor 102 and the gear mechanism 104. The boosting force is produced by the electric motor 102 and the gear mechanism 104 and is transmitted by the gear mechanism 102 to the actuating element 120 of the actuating unit 106. The rack sections 116 and 118 of the actuating element 120 are driven via the spur wheels 112 and 114 of the gear mechanism 104. The actuating element 120 rests by means of its end face facing away from the damping element 132 against the contact shoulder 142 of the force transmission element 122.

The actuating element 120 can move the force transmission element 122 to the left along the longitudinal axis L in FIG. 1 when the brake booster 100 is actuated. When the brake booster 100 is actuated, the force transmission element 122 with the surface 138 and the end face of the end element 140 of the actuating member 124 act on the rubber-elastic reaction disk 134. The force resulting from the sum of the actuating force produced by the driver and the boosting force produced by the electric motor 102 and the gear mechanism 106 is transmitted by the reaction disk 134 and the force introduction element 136 mounted thereon to the brake master cylinder 200. By means of the actuating force and the boosting force, the spring 144 is compressed, and the pressure piston 202 of the brake master cylinder 200 is moved to the left in the direction of the longitudinal axis L, as a result of which the second pressure piston 204 also moves to the left. A hydraulic brake pressure is thereby produced in the pressure chambers 208 and 210. The brake pressure produced in the pressure chambers 208 and 210 is transmitted via the brake circuits 302 and 304 to the wheel brakes 400 in order to perform a braking operation.

After a braking operation, the actuating unit 106 is moved to the right along the longitudinal axis L in FIG. 1. In order to prevent impact noises of the actuating unit 106 on the housing 130 of the brake booster 100, the damping element 132 is provided. The damping element 132 is arranged between the actuating unit 106 and, in particular, the actuating element 108 and the housing 130 in the direction of the longitudinal axis L. The damping element 132 extends substantially perpendicularly to the longitudinal axis L of the brake booster 100. By means of the damping element 132 it is possible to damp impact noises of the actuating element 108 on the housing 130 since the actuating element 108 no longer strikes directly on the housing 130.

Figure 2:
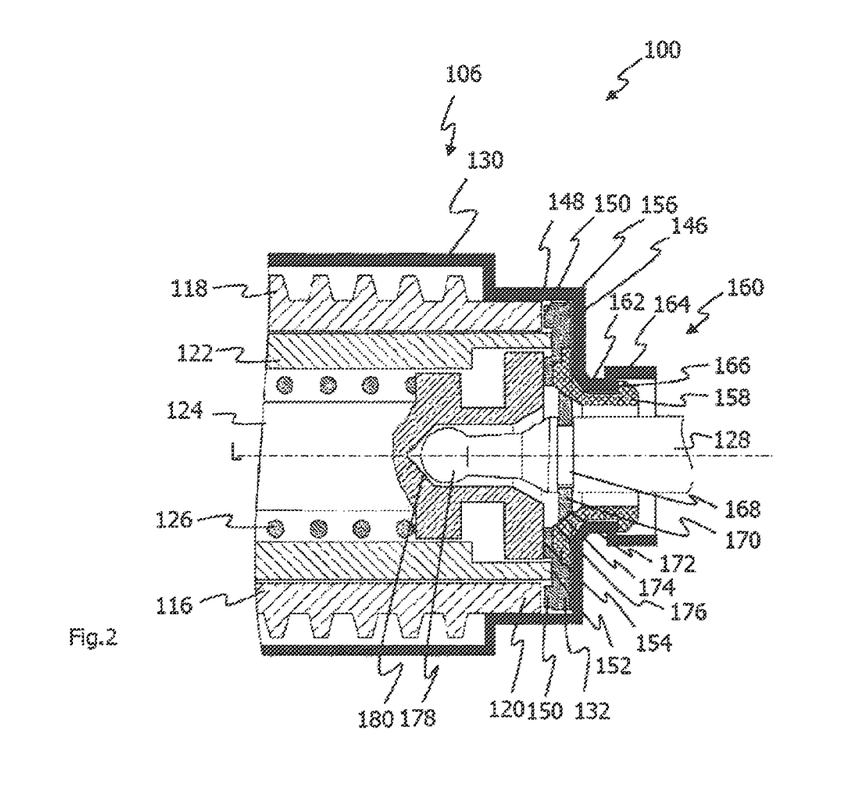
FIG. 2 shows an enlarged view of a segment of the brake booster shown in FIG. 1.

FIG. 2 shows an enlarged view of a segment of the brake booster 100 shown in FIG. 1. In the direction of the longitudinal axis L, the damping element 132 is arranged between the actuating element 120 and a section 146 of the housing 130 which extends substantially perpendicularly to the longitudinal axis L. The damping element 132 extends between the end face 148 of the actuating element 120 and the housing section 146. The damping element 132 has buffer elements 150, which project in the direction of the end face 148 of the actuating element 120.

In FIG. 2, the actuating unit 106 is shown in its rest or initial position. In the rest position, the buffer elements 150 are at a distance from the end face 148 of the actuating element 120. The end face 152 of the force transmission element 122 rests on the damping element 132 radially inwardly of the buffer elements 150. The same applies to the actuating member 124, which rests by means of its end face 154 on the damping element 132 radially inwardly of the force transmission element 122. When viewed in the radial direction, the damping element 132 is of stepped design in order to allow contact of the end faces 152 and 154 and, at the same time, a distance with respect to the end face 148 of the actuating element 122.

The damping element 132 and the buffer elements 150 are provided for the purpose of damping the impact of the actuating element 120 on the housing section 146 when the actuating unit 106 is moved back into its rest position. However, the damping element 132 can not only damp the impact of the actuating element 120 but, during a return movement of the actuating unit 106, can also act in damping fashion on the force transmission element 122 and the actuating member 124.

The damping element 132 has a damping section 156 and a fastening section 158. The damping section 156 is of disk-shaped design and extends around the force input member 128. The damping section 156 of the damping element 132 extends substantially parallel to the housing section 146. The fastening section 158 is used to fasten and position the damping element 132 on the housing 130. For this purpose, the housing 130 has a section 160 of stepped design. The section 160 of stepped design is formed by a section 162 of smaller diameter and a section 164 of larger diameter. The fastening section 158 of the damping element 132 has latching noses 166, which can be latched to the housing section 160 of stepped design. The fastening section 158 is of elastic design. When the fastening section 158 is inserted into the section 162 of smaller diameter, the fastening section 158 is compressed. As soon as the latching noses 166 reach the section 164 of larger diameter, the latching noses 166 move radially outward and latch in, wherein they rest against the transition between the section 162 of smaller diameter and the section 164 of larger diameter.

A groove 168 is formed on the force input member 128. A positioning element 170, which is of disk-shaped design, is arranged in the groove 168. The positioning element 170 has a conical section 172. The conical section 172 of the positioning element 170 interacts with a conical section 174 of the fastening section 158 of the damping element 132. By resting against one another, the conical sections 172 and 174 of the positioning element 170 and of the damping element 132 can center the force input member 128 in an opening 176 in the damping element 132.

The force input member 128 has a spherical end section 178, which is accommodated in a recess 180 of the actuating member 124. The spherical section 178 and the recess 180 form a joint, thus allowing deflection of the force input member 128 relative to the actuating member 124. The positioning element 170 and the damping element 132 hold the force input member 128 in an assembly position. In the assembly position, the longitudinal axis of the force input member 128 can coincide with the longitudinal axis of the brake booster L, as shown in FIG. 2. To facilitate the assembly of the brake booster 100, it is expedient to hold the force input member 128 in an assembly position. In the assembly position, the force input member 128 can be guided into the vehicle through an opening in the bulkhead (not shown) and, by virtue of the assembly position, can be connected quickly and easily to a brake pedal assembly within the passenger compartment of the vehicle. Here, the assembly position of the force input member 128 is chosen so that it corresponds to a defined position, which facilitates connection to the pedal assembly within the passenger compartment of the vehicle.

Figure 3:
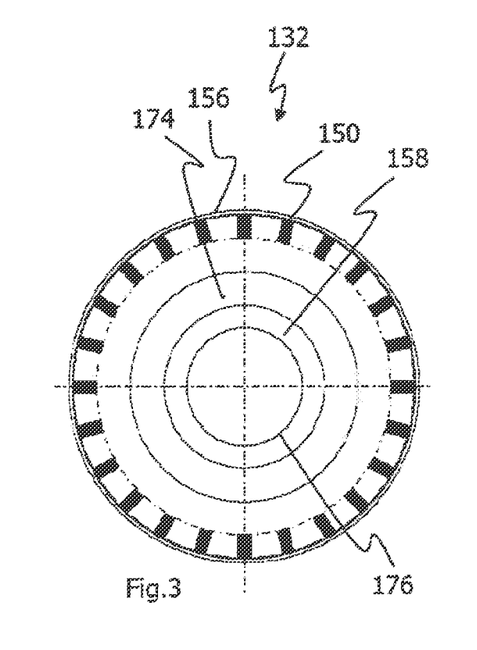
FIG. 3 shows a plan view of a damping element according to one illustrative embodiment.

FIG. 3 shows a plan view of the damping element 132. The damping element 132 has a damping section 156 and a fastening section 158. The opening 176 extends through the damping element 132. The damping section 156 is of disk-shaped design. A plurality of buffer elements 150 is provided along the circumference of the damping section 156. The buffer elements 150 are arranged on the damping section 156 in a manner offset with respect to one another in the circumferential direction. The buffer elements 150 are in the form of knob-shaped elevations, which have substantially a rectangular cross section. The opening 176 has a conical section 174, which can interact with the positioning element 170 (see FIG. 1).

Figure 4:
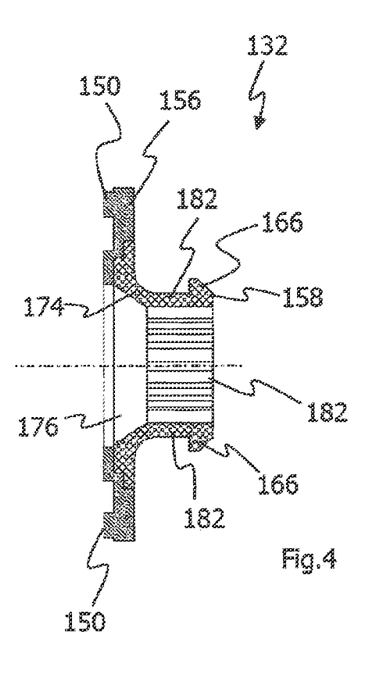
FIG. 4 shows a sectional view of the damping element shown in FIG. 3.

FIG. 4 shows a sectional view of the damping element 132. The damping element 132 is produced from two different materials. The damping section 156 is formed from a rubber-elastic material. The fastening section 158 can be produced from a harder material than the damping section 156. The fastening section 158 can be produced from plastic, for example. The fastening section 158 can be molded onto the damping section 156 by means of an injection molding process. The fastening section 158 has a plurality of fastening projections 182, on which the latching noses 166 are formed. The fact that the latching projections 182 are formed separately from one another and spaced apart ensures that the fastening section 158 is elastic. The flexibility of the end section 158 enables the fastening section 158 to be inserted into the housing section 160 of stepped design and to be latched to the housing section 160. The conical section 174 is formed on a wall of the opening 176 in the damping element 132, i.e. in the fastening section 156.

Figure 5:
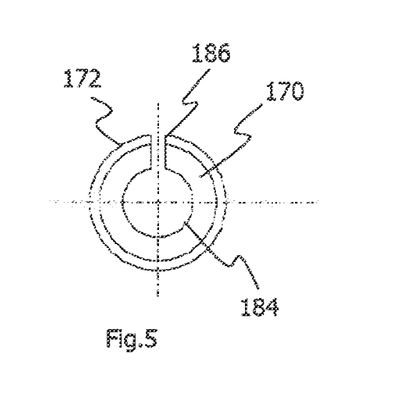
FIGS. 5 and 6 show views of a positioning element according to one illustrative embodiment.

FIG. 5 shows a plan view of the centering element 170. The centering element 170 has an opening 184 and a slot 186 extending in the radial direction. Furthermore, the positioning element 170 has a conical outer section 172, which interacts with the damping element 132. By means of the slot 186, the positioning element 170 can be mounted in the groove 168 on the force input member 128 (see FIG. 2). The slot 186 allows elastic expansion of the positioning element 170 as it is placed on the force input element 128 and enables it to receive the force input element 128 in the region of the groove 178 in the opening 184. The positioning element 170 is of disk-shaped design.

Figure 6:
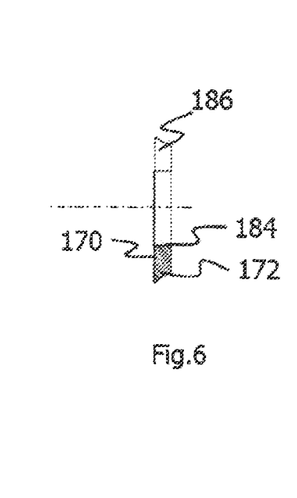

FIG. 6 shows a sectional view of the positioning element 170. In the sectional view in FIG. 6, the opening 184, the slot 186 and the conical section 172 of the positioning element 170 can be seen.

The damping element 132 arranged between the actuating unit 106 and the housing 130 can suppress unwanted noise generation or other vibration (and material fatigue phenomena resulting therefrom). The actuating unit 106 and, in particular, the actuating element 120 can no longer strike the housing 130 directly owing to the damping element 132. On the contrary, the damping element 132 damps the impact of the actuating element 120 on the housing 130, thus ensuring that noise generation, e.g. impact noises, is avoided.

The damping element 132 can furthermore interact with a positioning element 170 in order to hold the force input member 128 in a predefined assembly position. This assembly position of the force input element 128 is chosen in such a way that, during assembly, the force input member 128 can be connected quickly and easily to a brake pedal assembly within the passenger compartment.

The invention claimed is:

1. An electromechanical brake booster (100) for a vehicle, comprising:
    an actuating unit (106), which can be coupled to a brake cylinder (200), wherein the actuating unit (106) has at least one actuating element (120), which can be coupled to an electric motor (102) by means of a gear mechanism (104), and at least one actuating member (124) having a recess (180) for receiving a force input member (128);
    at least one housing (130), in which at least a section of the actuating unit (106) is accommodated; and
    at least one damping element (132) through which the force input member (128) extends, which is arranged between the at least one housing (130) and the at least one actuating element (120), wherein the at least one damping element (132) is arranged between the at least one housing (130) and the at least one actuating element (120) in the direction of a longitudinal axis (L) of the brake booster (106) for preventing contact between the at least one actuating element (120) and the at least one housing (130);
    the at least one damping element (132) having a damping section (156) and a fastening section (158), which holds the at least one damping element (132) on the at least one housing (130), the fastening section being tubular and the damping section being annular and extending outward from the fastening section.

2. The brake booster (100) as claimed in claim 1, wherein the fastening section (158) is designed to be latched to the at least one housing.

3. The brake booster (100) as claimed in claim 1, wherein the damping section (156) is of disk-shaped design.

4. The brake booster (100) as claimed in claim 1, wherein the damping section is produced from a flexible material.

5. The brake booster (100) as claimed in claim 1, wherein the actuating unit (106) has at least one positioning element (170), wherein the at least one positioning element (170) holds the force input member (128) in an assembly position.

6. The brake booster (100) as claimed in claim 5, wherein the at least one positioning element (170) has a conical section (172) by means of which the at least one positioning element (170) rests against the at least one damping element (132).

7. The brake booster (100) as claimed in claim 5, wherein the force input member (128) has a groove (168), in which the at least one positioning element (170) is arranged.

8. The brake booster (100) as claimed in claim 1, wherein the at least one actuating unit (106) has a force transmission element (122), which can be coupled in a force-transmitting manner to the at least one actuating element (120), wherein the force transmission element (122) accommodates the at least one actuating member (124).

9. The brake booster (100) as claimed in claim 8, wherein the force transmission element (122) has at least one contact shoulder (142), wherein the at least one actuating element (120) can be brought into contact with the at least one contact shoulder (142).

10. The brake booster (100) as claimed in claim 1, wherein the at least one actuating element (120) has at least one rack section (116, 118) coupled to the electric motor (102) by the gear mechanism (104).

11. An assembly for a vehicle brake system (1000) of the vehicle, comprising:
    the brake booster (100) as claimed in claim 1;
    the brake cylinder (200); and
    at least one brake circuit (300) fluidly connected to the brake cylinder (200).

12. The brake booster as claimed in claim 1, wherein the at least one damping element (132) is arranged between the at least one housing (130) and a surface (148) of the at least one actuating element (120) extending substantially perpendicularly to the longitudinal axis (L) of the brake booster (100).

13. An electromechanical brake booster (100) for a vehicle, comprising:
    an actuating unit (106), which can be coupled to a brake cylinder (200), wherein the actuating unit (106) has at least one actuating element (120), which can be coupled to an electric motor (102) by means of a gear mechanism (104), and at least one actuating member (124) having a recess (180) for receiving a force input member (128);
    at least one housing (130), in which at least a section of the actuating unit (106) is accommodated; and
    at least one damping element (132) through which the force input member (128) extends, which is arranged between the at least one housing (130) and the at least one actuating element (120), wherein the at least one damping element (132) is arranged between the at least one housing (130) and the at least one actuating element (120) in the direction of a longitudinal axis (L) of the brake booster (106) for preventing contact between the at least one actuating element (120) and the at least one housing (130);
    the at least one damping element (132) having a dampening section (156) and a plurality of buffer elements (150) extending therefrom, which project in the direction of the longitudinal axis (L) towards the at least one actuating element (120) and are circumferentially arranged about the longitudinal axis (L).

14. The brake booster (100) as claimed in claim 13, wherein the at least one damping element (132) has a damping section (156) and a fastening section (158), which holds the at least one damping element (132) on the at least one housing (130).

15. An electromechanical brake booster (100) for a vehicle, comprising:
    an actuating unit (106), which can be coupled to a brake cylinder (200), wherein the actuating unit (106) has at least one actuating element (120), which can be coupled to an electric motor (102) by means of a gear mechanism (104), and at least one actuating member (124) having a recess (180) for receiving a force input member (128);
    at least one housing (130), in which at least a section of the actuating unit (106) is accommodated; and
    at least one damping element (132) through which the force input member (128) extends, which is arranged between the at least one housing (130) and the at least one actuating element (120), wherein the at least one damping element (132) is arranged between the at least one housing (130) and the at least one actuating element (120) in the direction of a longitudinal axis (L) of the brake booster (106) for preventing contact between the at least one actuating element (120) and the at least one housing (130);
    the at least one damping element (132) having a damping section (156) and a fastening section (158), which holds the at least one damping element (132) on the at least one housing (130);
    the damping section (156) and the fastening section (158) being produced from different materials.

16. An electromechanical brake booster (100) for a vehicle, comprising:
    an actuating unit (106), which can be coupled to a brake cylinder (200), wherein the actuating unit (106) has at least one actuating element (120), which can be coupled to an electric motor (102) by means of a gear mechanism (104), and at least one actuating member (124) having a recess (180) for receiving a force input member (128);
    at least one housing (130), in which at least a section of the actuating unit (106) is accommodated; and
    at least one damping element (132) through which the force input member (128) extends, which is arranged between the at least one housing (130) and the at least one actuating element (120), wherein the at least one damping element (132) is arranged between the at least one housing (130) and the at least one actuating element (120) in the direction of a longitudinal axis (L) of the brake booster (106) for preventing contact between the at least one actuating element (120) and the at least one housing (130);
    the actuating unit (106) has at least one positioning element (170), the at least one positioning element (170) holding the force input member (128) in an assembly position;
    the at least one positioning element (170) having a conical section (172) by means of which the at least one positioning element (170) rests against the at least one damping element (132);
    a fastening section (158) of the at least one damping element (132) having an opening (176) with a conical section (174), which interacts with the conical section (172) of the at least one positioning element (170).

* * * * *